(12) United States Patent
Jung et al.

(10) Patent No.: US 8,890,487 B2
(45) Date of Patent: Nov. 18, 2014

(54) METHOD FOR REDUCING STANDBY POWER AND WIRELESS DEVICE USING THE SAME

(75) Inventors: Paul Jung, Suwon-si (KR); Chang Soo Yang, Seongnam-si (KR); Jung Hwan Park, Busan (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 215 days.

(21) Appl. No.: 13/109,127

(22) Filed: May 17, 2011

(65) Prior Publication Data

US 2011/0279091 A1 Nov. 17, 2011

(30) Foreign Application Priority Data

May 17, 2010 (KR) ........................ 10-2010-0045879

(51) Int. Cl.
*H02J 7/04* (2006.01)
*H02J 7/16* (2006.01)
*H02J 9/00* (2006.01)

(52) U.S. Cl.
CPC ....................................... *H02J 9/005* (2013.01)
USPC ........................................... 320/162; 315/294

(58) Field of Classification Search
USPC ................. 320/162; 315/209 SC, 227 R, 294
See application file for complete search history.

(56) References Cited

U.S. PATENT DOCUMENTS

| | | | | |
|---|---|---|---|---|
| 4,751,398 A | * | 6/1988 | Ertz, III | ........................ 307/66 |
| 5,799,196 A | * | 8/1998 | Flannery | ....................... 713/320 |
| 6,323,775 B1 | * | 11/2001 | Hansson | ..................... 340/636.1 |
| 7,626,353 B2 | * | 12/2009 | Kanouda et al. | ............... 320/101 |
| 7,639,963 B2 | * | 12/2009 | Matsuo | ............................ 399/88 |
| 2003/0137277 A1 | | 7/2003 | Mori et al. | |
| 2007/0300089 A1 | | 12/2007 | Bhogal et al. | |
| 2008/0075494 A1 | * | 3/2008 | Matsuo | ........................... 399/70 |
| 2008/0218317 A1 | * | 9/2008 | Choi | ........................ 340/286.01 |
| 2009/0289503 A1 | | 11/2009 | Hayashi et al. | |
| 2010/0231431 A1 | | 9/2010 | Sakamoto et al. | |

FOREIGN PATENT DOCUMENTS

| | | |
|---|---|---|
| DE | 102004047114 A1 | 5/2005 |
| JP | 11-122842 A | 4/1999 |

(Continued)

OTHER PUBLICATIONS

Machine Translation for JP 11-122842.*

(Continued)

*Primary Examiner* — Samuel Berhanu
(74) *Attorney, Agent, or Firm* — Sughrue Mion, PLLC

(57) ABSTRACT

The present invention provides a wireless device and method for reducing standby power. The method for reducing standby power of the wireless device includes the steps of: charging a charging battery with power supplied from an AC commercial power source in a normal mode of the wireless device, blocking the power of the AC commercial power source and converting an operation state of the wireless device so that the wireless device is in a standby mode when an operation-off signal used for turning off a predetermined device is transmitted from an outside. In this case, the wireless device receives the power with which the charging battery has been charged. In a standby mode, the wires device is periodically converted to be in a normal mode to transmit an operation state inquiry signal to the outside, so that it is possible to normally control the predetermined device.

11 Claims, 4 Drawing Sheets

(56) References Cited

FOREIGN PATENT DOCUMENTS

| KR | 10-2001-0014807 A | 2/2001 |
| KR | 1020010051491 A | 6/2001 |
| KR | 10-2002-0050457 A | 6/2002 |
| KR | 1020030087133 A | 11/2003 |
| KR | 10-2006-0071041 A | 6/2006 |
| KR | 10-2010-0028329 A | 3/2010 |

OTHER PUBLICATIONS

Machine translation of JP, 11-122842, Tabata, Satand-By Power Controlling Circuit for Electric Equipment With Remote Controller.*
Office Action issued Mar. 15, 2012 by the German Patent Office in counterpart German Patent Application No. 102011075961.1.
Korean Office Action issued Sep. 22, 2011 by the Korean Intellectual Property Office in Korean Patent Application No. 10-2010-0045879.

* cited by examiner

METHOD FOR REDUCING STANDBY POWER AND WIRELESS DEVICE USING THE SAME

CROSS-REFERENCE TO RELATED APPLICATIONS

This application claims the benefit of Korean Patent Application No. 10-2010-0045879 filed with the Korea Intellectual Property Office on May 17, 2010, the disclosure of which is incorporated herein by reference.

BACKGROUND OF THE INVENTION

1. Field of the Invention

The present invention relates to a wireless device; and, more particularly, to a technology in which it is possible to reduce standby power of a wireless device.

2. Description of the Related Art

In general, a dimmer has been used to provide economical power consumption and reasonable illuminance of an illumination device in consideration of an indoor environment. A dimmer is connected to an illumination device, and thus controls the connected illumination device, e.g., power on/off, the level of illuminance, the level of color temperature, and so on.

With the recent development of wireless communication technologies, a technology has been developed in which a wireless dimmer can control a number of illumination devices even in a remote area. In this case, for frequently controlling each of the illumination devices, a control unit of the wireless dimmer should normally operate at all times. Due to this, the wireless dimmer unnecessarily consumes power.

For example, a description will be given of a case where a school with 30 classrooms uses a wireless dimmer with standby power of 1 W (where, standby power of 1 W is a level enough to be considered as excellent products with efficient standby power). If it is assumed that 16 illumination devices are installed in each of the classrooms in the school, the wireless dimmer totally consumes unnecessary standby power of 480 W even when power sources of the illumination devices are all turned off.

SUMMARY OF THE INVENTION

The present invention has been proposed in order to overcome the above-described problems and it is, therefore, an object of the present invention to provide a wireless device and a method for reducing standby power, which is implemented by charging a charging battery with power supplied from an AC commercial power source in a normal mode, and then receiving the charged power of the charging battery in a standby mode.

In accordance with one aspect of the present invention to achieve the object, there is provided a wireless device which wirelessly communicates with an outside and controls a predetermined device according to a control signal transmitted from the outside, the wireless device including: a switch for receiving AC power supplied from an AC commercial power source; a converter for converting the AC power received in the switch into DC power; a charging battery; a charging circuit for charging the charging battery with the converted DC power; and a control unit for turning off the switch to block supply of the AC power and converting an operation state of the wireless device from a normal mode to a standby mode, when an operation-off signal instructing the control unit to turn off the predetermined device is transmitted from the outside.

The charging circuit charges the charging battery with the converted DC power simultaneously while supplying the converted DC power to the control unit, when the operation state of the wireless device is in a normal mode.

The charging circuit supplies to the control unit the power with which the charging battery has been charged, when the operation state of the wireless device is converted from a normal mode to a standby mode.

The control unit periodically converts the operation state of the wireless device from the standby mode to a normal mode, and transmits an operation state inquiry signal to the outside.

The control unit checks a voltage level of the charging battery when the operation state of the wireless device is periodically converted to a normal mode.

When the voltage level of the charging battery is equal to or less than a preset value, the control unit converts the operation state of the wireless device so that the wireless device is in a normal mode, and receives power supplied from the AC commercial power source to charge the charging battery with the received power.

When the charging battery is completely charged, the control unit reconverts the operation state of the wireless device so that the wireless dimmer is in a standby mode.

In accordance with another aspect of the present invention to achieve the object, there is provided a method for reducing standby power of a wireless device which wirelessly communicates with an outside and controls a predetermined device according to a control signal transmitted from the outside, the method including the steps of: (A) charging a charging battery with power supplied from an AC commercial power source, by a charging circuit; (B) when an operation-off signal, instructing a control unit to turn off the predetermined device, is transmitted from the outside, turning off the predetermined device, and turning off a switch connected to the AC commercial power source to block power supplied from the AC commercial power source, by the control unit; (C) converting the operation state of the wireless device from a normal mode to a standby mode, by the control unit; and (D) supplying to the control unit the power with which the charging battery has been charged, by the charging circuit.

The method further includes a step of: (E) periodically converting the operation state of the wireless device from the standby mode to a normal mode to transmit an operation state inquiry signal to the outside, by the control unit, after step (D).

The method further comprises the steps of: (F-1) periodically converting the operation state of the wireless device from the standby mode to a normal mode to check a voltage level of the charging battery, by the control unit; (F-2) converting the operation state of the wireless device so that the wireless device is in a normal mode when the voltage level of the charging battery is equal to or less than a preset value, by the control unit; and (F-3) turning on a switch connected to the AC commercial power source, by the control unit, and receiving power supplied from the AC commercial power source to charge the charging battery with the supplied power, by the charging circuit, after step (D).

The method further includes the steps of: (F-4) checking whether or not the charging battery is completely charged, by the control unit; and (F-5) when the charging battery is completely charged, reconverting the operation state of the wireless device so that the wireless device is in a standby mode, by the control unit, after step (F-3).

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 2 is a block diagram showing how to operate in the wireless device for reducing standby power in accordance with the embodiment of the present invention when an illumination device is turned on;

DETAILED DESCRIPTION OF THE PREFERABLE EMBODIMENTS

Hereinafter, a preferred embodiment according to the present invention will be described with reference to FIGS. 1 to 4. However, this is only for illustrative example, and the present invention is not limited thereto.

In the following description of the present invention, a detailed description of known functions and configuration incorporated herein will be omitted when it may make the subject matter of the present invention rather unclear. Terms which will be later are defined on the basis of the entire contents of the present specification.

Technical idea of the present invention is decided by the scope of claims, and the following embodiment is only for illustrative means to help those skilled in the art to understand.

Figure 1:
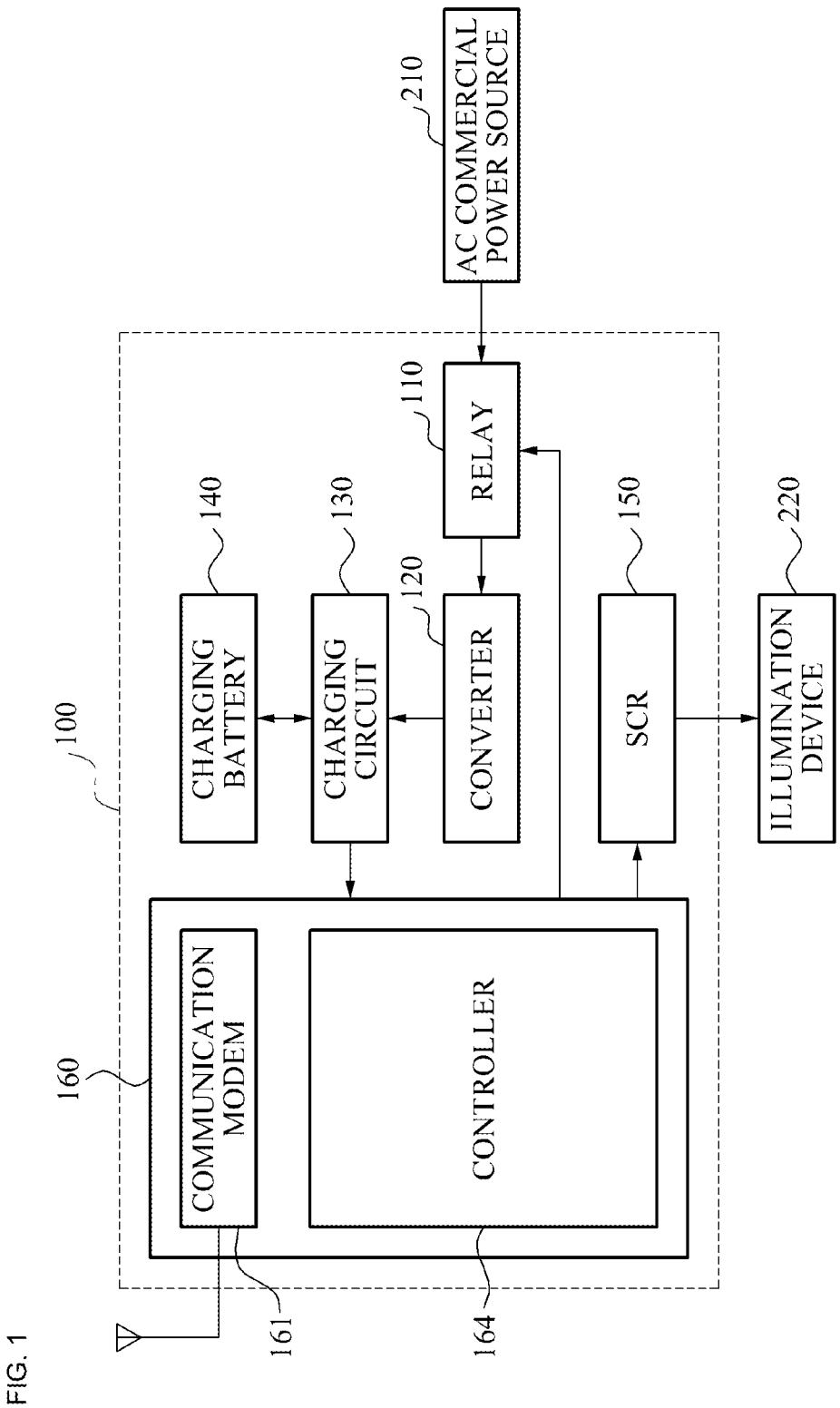
FIG. 1 is a block diagram showing a construction of a wireless device for reducing standby power in accordance with an embodiment of the present invention.

FIG. 1 is a block diagram showing a construction of a wireless device for reducing standby power in accordance with an embodiment of the present invention. Herein, although a wireless dimmer is exemplified as a wireless device which can reduce standby power, the present invention is not limited thereto and can be applied to a variety of wireless devices and wireless sensor networks.

Referring to FIG. 1, a wireless dimmer 100 includes a relay 110, a converter 120, a charging circuit 130, a charging battery 140, a SCR (Silicon Controlled Rectifier) 150, and a control unit 160.

The relay 110 is turned on/off according to the control of the control unit 160. When the relay 110 is turned on, the relay 110 receives AC power supplied from an AC commercial power source 210, and then transfers the supplied AC power to the converter 120. When the relay 110 is turned off, the relay 110 blocks AC power that the AC commercial power source 210 supplies. That is, under the control of the control unit 160, the relay 110 plays a role of a switch that decides supply or non-supply of the AC power source.

The converter 120 converts the AC power into DC power and transfers the converted DC power to the charging circuit 130.

The charging circuit 130 supplies the DC power, received from the converter 120, to both the charging battery 140 and the control unit 160. In this case, the charging circuit 130 charges the charging battery 140 with the DC power transferred from the converter 120.

When DC power fails to be transferred from the converter 120, the charging circuit 130 supplies to the control unit 160 the DC power with which the charging battery 140 has been charged.

The SCR 150 performs illumination control of an illumination device 220 under the control of the control unit 160. For example, the SCR 150 controls the illuminance (brightness) level and color temperature level of the illumination device 220 under the control of the control unit 160.

The control unit 160 includes a communication modem 161 and a controller 164. The communication modem 161 wirelessly communicates with the outside (e.g., central control device for controlling illumination devices in a corresponding building), and the controller 164 controls the respective components. For example, when an illumination control signal (e.g., illuminance level signal or color temperature level signal) is inputted from the outside, the controller 164 transfers the illumination control signal to the SCR 150 to thereby control illuminance (brightness) and color temperature of the illumination device 220 according to the illumination control signal.

Although it is exemplified in the embodiment of the present invention that the communication modem 161 may be integrated with the control unit 160, the communication modem 161 may also be constructed separately from the control unit 160. In this case, the communication modem 161 receives power through the charging circuit 130.

When an illumination-off signal is inputted from the outside, the controller 164 controls the SCR 150 to turn off the illumination device 220 and the relay 110 at the same time, thereby blocking the power supplied from the AC commercial power source 210. In this case, since DC power fails to be transferred from the converter 120, the charging circuit 130 supplies to the control unit 160 the DC power with which the charging battery 140 has been charged.

In the embodiment of the present invention, a signal used for turning off the illumination device 220 is named an illumination-off signal, since a device controlled is an illumination device. However, the illumination-off signal may be generally named an operation-off signal.

Also, the controller 164 converts an operation state of the wireless dimmer 100 so that the wireless dimmer 100 is in a standby mode. In the standby mode, the controller 164 performs periodic conversion to a normal mode to thereby transmit an illumination state inquiry signal to the outside through the communication modem 161. The illumination state inquiry signal refers to a signal inquiring change of the operation state of a corresponding illumination device, that is, whether a corresponding illumination device is to be kept off, or a corresponding illumination device is to be turned on. A signal used for inquiring the state of the illumination device 220 is named an illumination state inquiry signal since a device controlled is an illumination device. However, the illumination state inquiry signal may be generally named an operation state inquiry signal.

The controller 164 checks a voltage level of the charging battery 140 whenever the operation state of the wireless dimmer 100 is periodically converted from the standby mode to the normal mode. When the check result shows that the voltage level of the charging battery 140 is equal to or less than a preset value, the controller 164 allows the relay 110 to be turned on in order to receive power supplied from the AC commercial power source 210. In this case, the controller 164 fully converts the operation state of the wireless dimmer 100 from the standby mode to the normal mode, and then charges the charging battery 140 in the normal mode of the wireless dimmer 100.

Figure 2:
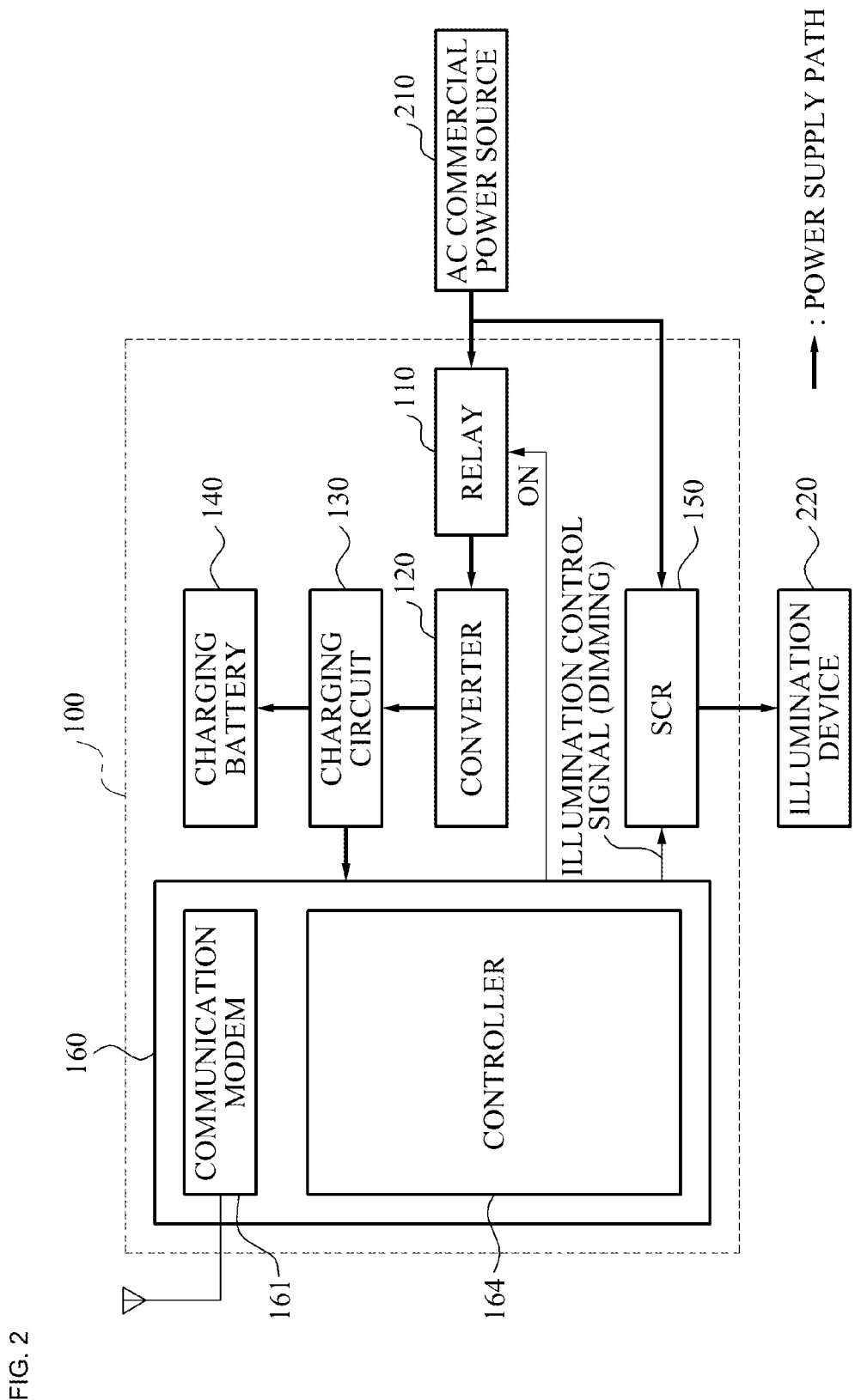
Figure 3:
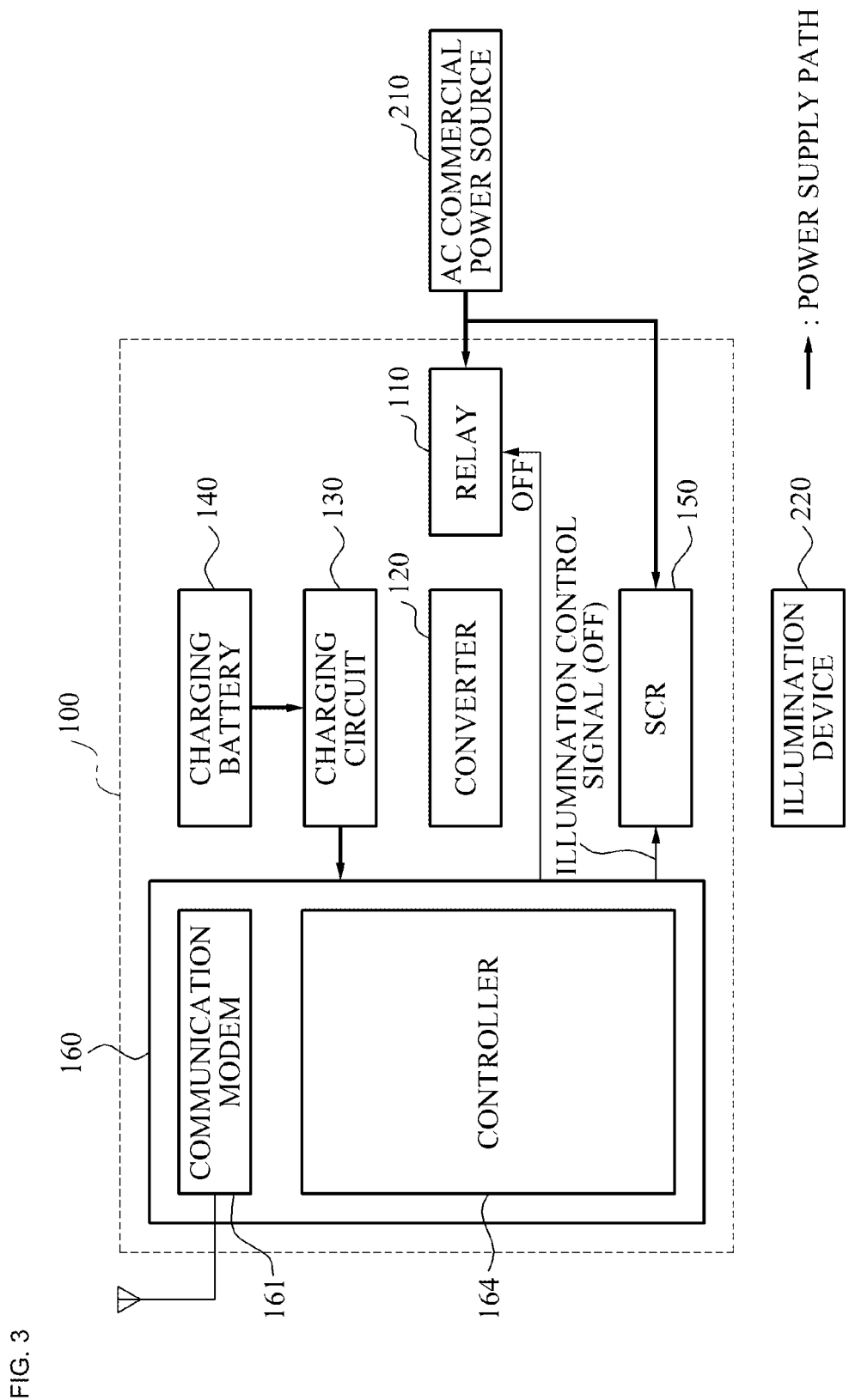
FIG. 3 is a block diagram showing how to operate in the wireless device for reducing standby power in accordance with the embodiment of the present invention when an illumination device is turned off.

FIG. 2 is a block diagram showing how the wireless device for reducing standby power operates when an illumination device is turned on. FIG. 3 is a block diagram showing how the wireless device for reducing standby power operates when an illumination device is turned off.

Referring to FIG. 2, when the illumination device 220 is turned on, the illumination device 220 receives AC power supplied from the AC commercial power source 210 through the relay 110. In this case, the converter 120 converts the supplied AC power into DC power. The charging circuit 130 supplies the converted DC power to the control unit 160 at the same time while charging the charging battery 140 with the converted DC power. Also, the controller 164 receives an illumination control signal from the outside through the communication modem 161, and transfers the received illumination control signal to the SCR 150 to thereby control the illumination device 220. Herein, the illumination control signal may be a dimming signal.

Meanwhile, referring to FIG. 3, when an illumination-off signal is transferred from the outside through the communication modem 161, the controller 164 controls the SCR 150 so that the illumination device 220 is turned off. At the same time, the controller 164 turns off the relay 110 to thereby block power supplied from the AC commercial power source 210. In this case, the charging circuit 130 supplies to the control unit 160 the DC power with which the charging battery 140 has been charged.

Herein, when the illumination device 220 is turned off, the control unit 160 converts the operation state of the wireless dimmer 100 so that the wireless dimmer 100 is in a standby mode. When the wireless dimmer 100 is in the standby mode, currents of 10 µA or lower are consumed.

When the wireless dimmer 100 is in the standby mode, the controller 164 periodically converts the operation state of the wireless dimmer 100 from the standby mode to the standby mode, and transmits an illumination state inquiry signal to the outside, by an inner timer.

That is, since the communication modem 161 fails to receive an illumination control signal transmitted from the outside when the wireless dimmer 100 is in a standby mode, the controller 164 periodically converts the operation state of the wireless dimmer 100 so that the wireless dimmer 100 is in a normal mode, and then transmits to the outside an illumination state inquiry signal inquiring whether a corresponding illumination device is to be kept off, or a corresponding illumination device is to be turned on.

In this case, when the wireless dimmer 100 is in a normal mode, current consumption occurs (e.g., current of approximately 50 mA). Herein, if it is assumed that the operation state of the wireless dimmer 100 is converted from a standby mode to a normal mode in a period of 50 ms, a current consumed by the wireless dimmer 100 is 2.509 mA per 1 second which results from (50 mA×0.05 s)+(0.01 mA×0.95 s)=2.509 mA.

As such, when the illumination device 220 is turned off, the control unit 160 converts the operation state of the wireless dimmer 100 so that the wireless dimmer 100 is in a standby mode, and then periodically converts the operation state of the wireless dimmer 100 from the standby mode to the normal mode. Therefore, it is possible not only to perform a normal operation of the wireless dimmer 100, but also to reduce consumption of standby power.

If the control unit 160 fails to convert the operation state of the wireless dimmer 100 so that the wireless dimmer 100 is in a standby mode when the illumination device 220 is turned off, the wireless dimmer 100 continues to consume currents of 50 mA per 1 second, which results in rapid discharging of a battery.

Meanwhile, the controller 164 checks a voltage level of the charging battery 140 whenever the operation state of the wireless dimmer is periodically converted from a standby mode to a normal mode, in order to provide for a case where the charging battery 140 is totally discharged. Herein, when the voltage level of the charging battery 140 is equal to or less than a preset value, the controller 164 fully converts the operation state of the wireless dimmer 100 from a standby mode to a normal mode.

That is, when the voltage level of the charging battery 140 is equal to or less than a preset value, the controller 164 turns on the relay 110 to receive power supplied from the AC commercial power source 210. Then, the charging circuit 130 charges the charging battery 140 with the supplied power. The controller 164 may reconvert the operation state of the wireless dimmer 100 so that the wireless dimmer 100 is in a standby mode, as soon as the charging battery 140 is completely charged.

According to the embodiment of the present invention, when the illumination device 220 is turned off, the operation state of the wireless dimmer 100 is converted to be a standby mode, so that it is possible to reduce standby power consumed in the wireless dimmer 100. Additionally, it is possible to control the illumination device 220 by normally performing wireless communication with the outside through periodic conversion to a normal mode from a standby mode.

Figure 4:
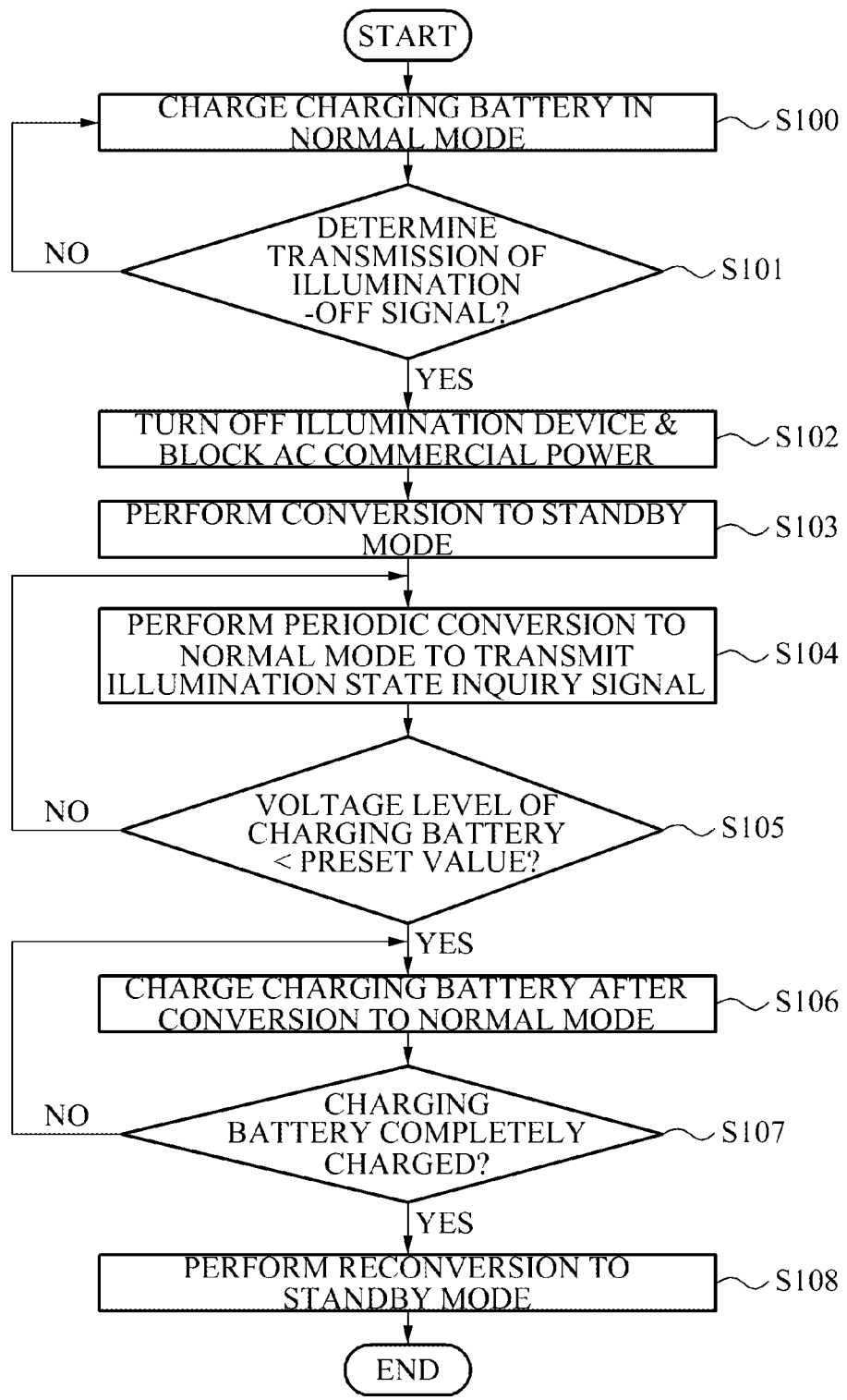
FIG. 4 is a flowchart showing a method for reducing standby power of the wireless device in accordance with the embodiment of the present invention.

FIG. 4 is a flowchart showing a method for reducing standby power of the wireless device in accordance with an embodiment of the present invention.

Referring to FIG. 4, the charging circuit 130 charges the charging battery 140 with power supplied from the AC commercial power source 210 in a normal mode (step S100). In this case, the charging circuit 130 charges the charging battery 140 with the power supplied from the AC commercial power source 210 at the same time while the charging circuit 130 supplies the supplied power to the control unit 160.

Next, the controller 164 confirms whether an illumination-off signal is transmitted from the outside (e.g., central control device) (step S101). When it is confirmed that the illumination-off signal is transmitted, the controller 164 controls the SCR 150 so that the illumination device 220 is turned off simultaneously while turning off the relay 110 to thereby block power supplied from the AC commercial power source 210 (step S102).

Thereafter, the controller 164 converts the operation state of the wireless dimmer 100 from a normal mode to a standby mode (step S103). As such, when the operation state of the wireless dimmer 100 is converted to the standby mode, the control unit 160 receives power that the charging battery 140 supplies.

Thereafter, the controller 164 periodically converts the operation state of the wireless dimmer 100 so that the wireless dimmer 100 is in a normal mode, and then transmits an illumination state inquiry signal to the outside through the communication modem 161 (step S104).

The controller 164 checks the voltage level of the charging battery 140 whenever an operation state of the wireless dimmer 100 is periodically converted to a normal mode, thereby confirming whether the voltage level of the charging battery 140 is equal to or less than the preset value (step S105).

According to the check result in the step S105, when the voltage level of the charging battery 140 is equal to or less than the preset value, the controller 164 fully converts the operation state of the wireless dimmer 100 from a standby mode to a normal mode to charge the charging battery 140 (step S106).

That is, even in a case where the operation state of the wireless dimmer is in a standby mode, the control unit 160 receives power supplied from the charging battery 140, and thus periodically checks the voltage level of the charging battery 140. By the check result, when the voltage level of the charging battery 140 is equal to or less than the preset value, the control unit 160 converts the operation state of the wireless dimmer 100 so that the wireless dimmer is in a normal mode, and then charges the charging battery 140.

Thereafter, the controller 164 confirms whether or not the charging battery 140 is completely charged (step S107). When the confirming result shows that the charging battery 140 is completely charged, the controller 164 reconverts the operation state of the wireless dimmer 100 so that the wireless dimmer 100 is in a standby mode (step S108).

According to the present invention, it is possible to reduce standby power in a wireless device by performing the steps of: charging a charging battery with power supplied from an AC commercial power source in a normal mode of the wireless device, and when an operation-off signal is transmitted from the outside, converting an operation state of the wireless device to a standby mode to receive the power with which the charging battery has been charged.

In addition, it is possible to wirelessly communicate with an outside through periodic conversion to a normal mode from a standby mode, thereby normally controlling a predetermined device even in a standby mode.

As described above, although the preferable embodiments of the present invention have been shown and described, it will be appreciated by those skilled in the art that substitutions, modifications and variations may be made in these embodiments without departing from the principles and spirit of the general inventive concept, the scope of which is defined in the appended claims and their equivalents.

What is claimed is:

1. A wireless device which wirelessly communicates with an external entity and controls a predetermined device according to a control signal transmitted from the external entity, the wireless device comprising:
a switch for receiving AC power supplied from an AC commercial power source;
a converter for converting the AC power received in the switch into DC power;
a charging battery;
a charging circuit for charging the charging battery with the converted DC power; and
a control unit for simultaneously turning off the switch to block supply of the AC power, converting an operation state of the wireless device from a normal mode to a standby mode, and turning off the predetermined device, in response to receiving an operation-off signal instructing the control unit to turn off the predetermined device which is transmitted from the external entity,
wherein the predetermined device controlled by the wireless device is located externally to the wireless device,
wherein, in the normal mode, the charging circuit supplies the control unit with the converted DC power, and in the standby mode, the charging battery supplies the control unit with the converted DC power stored in the charging battery.

2. The wireless device of claim 1, wherein the charging circuit charges the charging battery with the converted DC power while simultaneously supplying the converted DC power to the control unit, when the operation state of the wireless device is in the normal mode.

3. The wireless device of claim 1, wherein the charging circuit supplies to the control unit power which the charging battery generates based on the converted DC power used to charge the charging battery, when the operation state of the wireless device is converted from the normal mode to the standby mode.

4. The wireless device of claim 3, wherein the control unit periodically converts the operation state of the wireless device from the standby mode to the normal mode, and transmits an operation state inquiry signal to the external entity.

5. The wireless device of claim 4, wherein the control unit checks a voltage level of the charging battery when the operation state of the wireless device is periodically converted to the normal mode.

6. The wireless device of claim 5, wherein, when the voltage level of the charging battery is equal to or less than a preset value, the control unit converts the operation state of the wireless device so that the wireless device is in the normal mode, and receives power supplied from the AC commercial power source to charge the charging battery with the received power.

7. The wireless device of claim 6, wherein, when the charging battery is completely charged, the control unit reconverts the operation state of the wireless device so that the wireless device is in the standby mode.

8. A method for reducing standby power of a wireless device which wirelessly communicates with an external entity and controls a predetermined device according to a control signal transmitted from the external entity, the method comprising the operations of:
(A) charging a charging battery with power supplied from an AC commercial power source, by a charging circuit;
(B) in response to receiving, at a control unit, an operation-off signal instructing the control unit to turn off the predetermined device, which is transmitted from the external entity, simultaneously turning off the predetermined device, turning off a switch connected to the AC commercial power source to block power supplied from the AC commercial power source, and converting an operation state of the wireless device from a normal mode to a standby mode, by the control unit; and
(C) supplying to the control unit power which the charging battery generates based on the power supplied from the AC commercial power source, by the charging circuit,
wherein the predetermined device controlled by the wireless device is located externally to the wireless device, and
wherein, in the normal mode, the charging circuit supplies the control unit with converted DC power, and in the standby mode, the charging battery supplies the control unit with the power which the charging battery generates based on the power supplied from the AC commercial power source.

9. The method of claim 8, wherein after operation (C), the method further comprises the operation of:
(D) periodically converting the operation state of the wireless device from the standby mode to a normal mode to transmit an operation state inquiry signal to the external entity, by the control unit.

10. The method of claim 9, wherein after operation (C), the method further comprises the operations of:
(E-1) periodically converting the operation state of the wireless device from the standby mode to a normal mode to check a voltage level of the charging battery, by the control unit;

(E-2) converting the operation state of the wireless device so that the wireless device is in the normal mode when the voltage level of the charging battery is equal to or less than a preset value, by the control unit; and (E-3) turning on a switch connected to the AC commercial power source, by the control unit, and receiving power supplied from the AC commercial power source to charge the charging battery with the supplied power, by the charging circuit.

11. The method of claim 10, wherein after step (E-3), the method further comprises the operation of:

(E-4) checking whether or not the charging battery is completely charged, by the control unit; and (E-5) when the charging battery is completely charged, reconverting the operation state of the wireless device so that the wireless device is in the standby mode, by the control unit.

* * * * *